Figure 1:
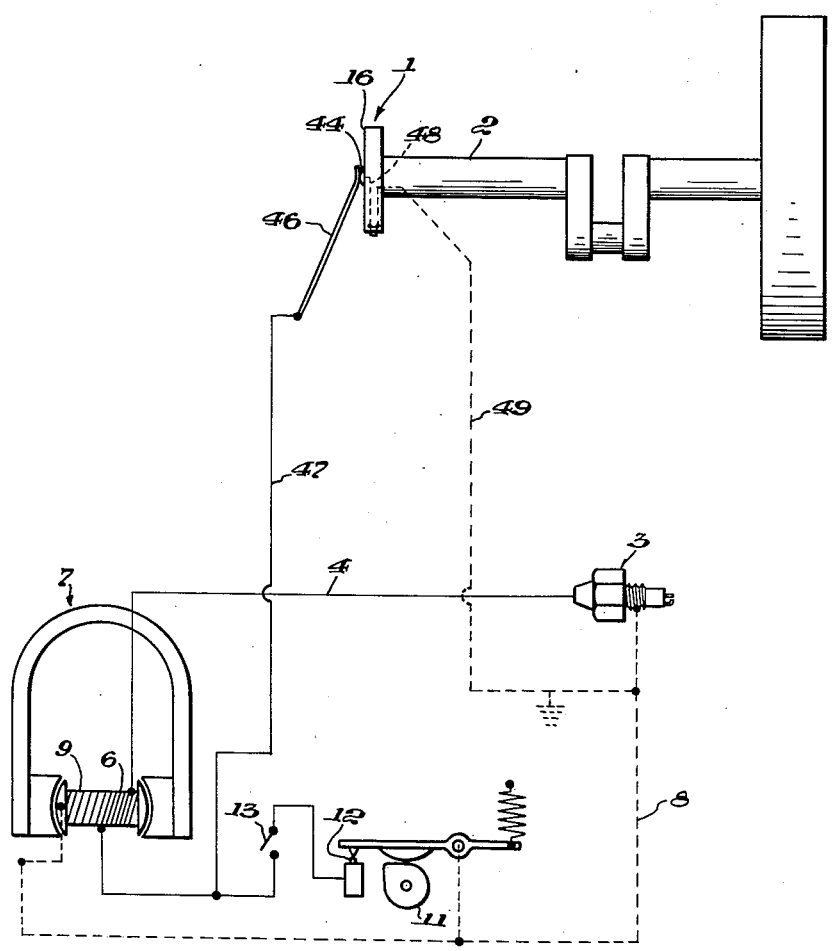

March 31, 1953 W. B. STAMFORD 2,633,511
APPARATUS FOR CONTROLLING THE POWER SUPPLY OF MACHINES
Filed Jan. 30, 1950 2 SHEETS—SHEET 2
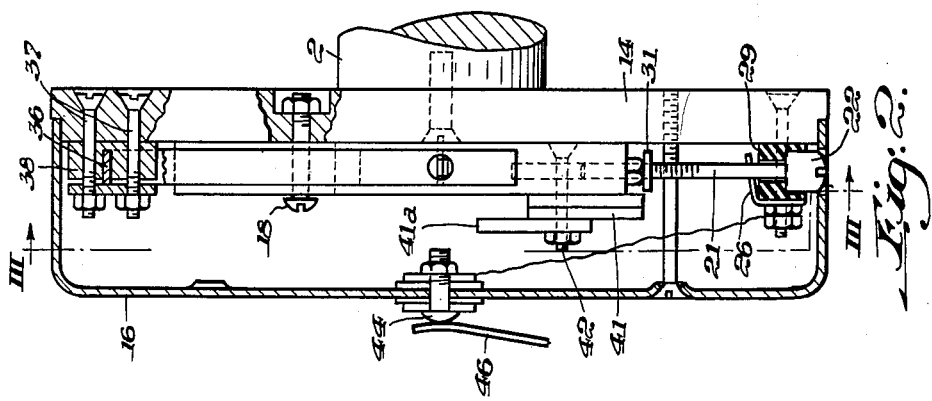
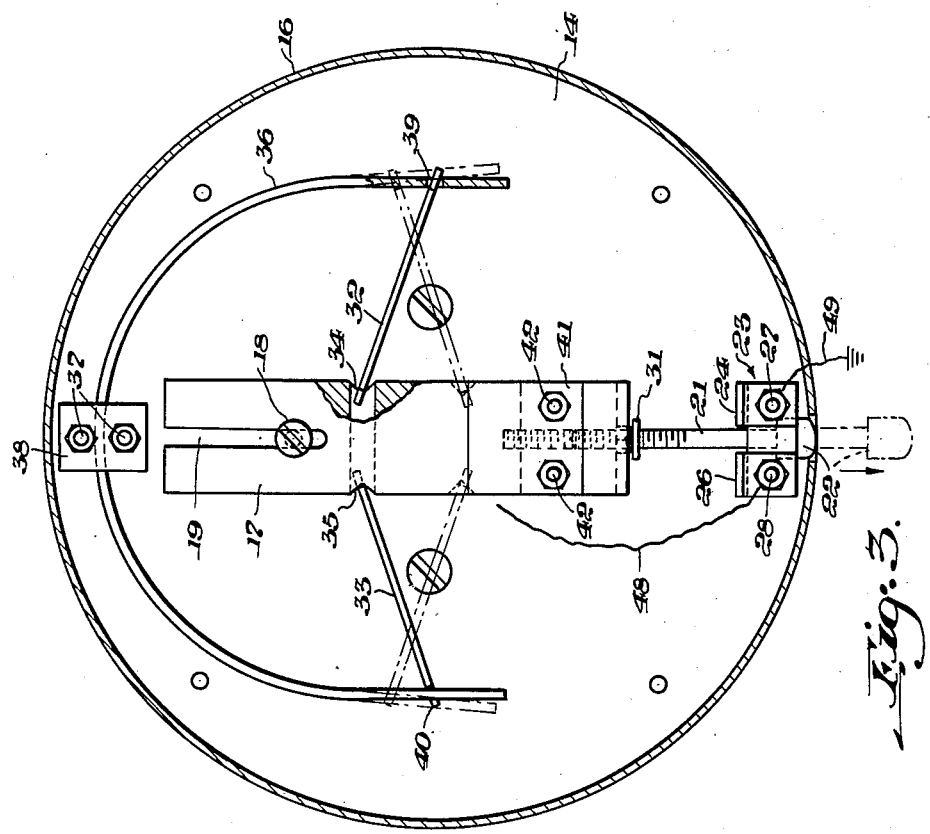
INVENTOR.
WILLIAM B. STAMFORD.
BY Brown, Critchlow, Flick & Peckham
his ATTORNEYS.

Patented Mar. 31, 1953

2,633,511

UNITED STATES PATENT OFFICE 2,633,511

APPARATUS FOR CONTROLLING THE POWER SUPPLY OF MACHINES

William B. Stamford, Pittsburgh, Pa.

Application January 30, 1950, Serial No. 141,235

2 Claims. (Cl. 200—80)

This invention relates to apparatus for controlling the power supplied to various types of machines, and in particular, to centrifugally actuated apparatus for cutting off the power supply of the machine when a driven member reaches a predetermined speed.

It is recognized that a great many centrifugally actuated switches have been devised for limiting the speed of power driven members, these commonly being referred to as "governors" and operating first to shut off the power when a certain speed is reached and then automatically to resume the supply of power when the speed is reduced a predetermined amount. However, with certain types of machinery, it is desirable to shut down its operation completely when a certain speed has been reached so that an operator can inspect it, make the necessary repairs or adjustments and assure himself that the machinery is in safe condition for renewed operation. For example, many oil wells are pumped by gas or gasoline internal combustion engines which run hour after hour without any attention, and sometimes they "run away" or, in other words, run at excessively high speeds, with the result that their driven parts fly to pieces. With such machinery, it may become desirable to shut down operation completely for the purposes mentioned above, and, it will be readily recognized that, governors which automatically effect a resumption of operation once the speed of the driven parts has been reduced sufficiently, are not suitable for such purposes. As far as I am aware, there are few governors of the type which completely shut off the power supply, and these are relatively complicated, expensive and uncertain in operation.

It is therefore an object of this invention to provide apparatus for controlling the power supplied to driven members of various types of machinery in such a manner that the power is shut off when a predetermined speed of a driven member of the machinery has been reached, the apparatus operating in such a way that the power remains shut off until the apparatus is manually reset.

Another object is to provide apparatus according to the above object which is simple, effective, inexpensive and certain in its operation.

According to the invention, the apparatus includes a switch arm slidably mounted on a driven member of the machinery to be controlled, this arm being held in a set position with respect to the driven member by a toggle arm that is resiliently pressed against it. When the driven member reaches a predetermined speed, its movement exerts a force upon the switch arm which is sufficient to slide the arm from its set position against the resilient pressure of the toggle arm. Also, an electrical switch, preferably, is carried by the driven member in such position that this sliding movement of the switch arm either opens or closes the switch, and, through a suitable electric circuit, the switch actuation operates to shut off the supply of motive power to the driven member. As the switch moves from its set position to its second position, the toggle arm snaps from the position in which it initially held the switch arm to a second position in which it resiliently presses and holds the switch arm in its second position until the latter is manually returned to its set position.

Most suitably, the apparatus is used to control the speed of a rotatably driven machine member such as a crank shaft powered by an internal combustion engine or a belt-driven pulley or sheave. However, it will be recognized later that the apparatus also could be mounted upon a reciprocating machine member and, in such cases, the throw of the switch arm would be effected by excessively rapid reversals in the travel of the member, or by an undue impact such, for instance, as occurs when an oil well "pumps off."

The preferred embodiment of the invention is illustrated in the accompanying drawings, of which Fig. 1 is a schematic showing of the apparatus mounted on a crank shaft as well as suitable diagrammatic electric circuits for supplying and controlling the supply of shaft-rotating power; Fig. 2 is an enlarged vertical section through the switch mechanism of the apparatus; and Fig. 3 is a section taken along the broken line III—III of Fig. 2.

Referring to Fig. 1, the apparatus of the invention, generally indicated by numeral 1, is mounted on a shaft 2 which is shown as a crank shaft and which forms part of, or is a member driven by an internal combustion engine; this engine including a spark plug 3 electrically connected by a conductor 4 to secondary winding 6 of a high tension magneto 7, the armature of the magneto being wound as an auto-transformer. The magneto-spark plug circuit is completed by a conductor 8 that connects low tension primary winding 9 of the magneto with the spark plug, conductor 8 customarily being simply the metal structure of the engine. As will be noted, the circuit diagram of Fig. 1 shows the ground side of the circuits in dotted lines, and this is true for the motive power supplying circuit, as well as for the control circuit to be described. The power supply circuit also includes such commonly used elements as a timing cam 11, breaker points 12 and a manually operated shut down switch 13 the operations of all of which are well-known and should need no detailed description.

Switching mechanism 1 is slidably carried on a plate or disc 14 (Figs. 2 and 3) that is bolted to crank shaft 2, and the mechanism is enclosed by a casing 16 bolted at several points to disc 14. The mechanism includes a switch arm 17 slidably held to plate 14 by a bolt 18, the switch arm being provided with a longitudinally-extending slot 19 in which the bolt rides. Also, switch arm 17 includes an extension 21 which, preferably, is a plunger provided at its outer end with a head 22 and having its inner end threaded and in a screw engagement with the other portion of arm 17.

The switch arm is adapted to close and open a switch generally designated by the numeral 23, this switch being made up of a pair of contact members 24 and 26, each of which electrically contacts one of a pair of bolts 27 and 28 by which the contact members are held to plate 14. Further, the contact members are insulated from plunger head 22 by insulating block 29, and plunger 21 has mounted on it a contact bar 31 which closes the switch when the arm slides outwardly to its dotted line position shown in Fig. 3.

Normally, switch arm 17 is held in its full line position (Fig. 3) by means of a pair of toggle arms 32 and 33 which engage in shallow openings 34 and 35 provided in the sides of the switch arms. These toggle arms are resiliently pressed against the switch arm by a leaf type spring 36 which is clamped by bolts 37 against a block 38, and the bolts hold the blocks, as well as the spring, to disc 14. As seen best in Fig. 3, spring 36 extends downwardly along the sides of the switch arm and, near each of its ends, the spring is provided with apertures 39 and 40 fitted to receive the outer end portions of toggle arms 32 and 33, these toggle arm outer ends being reduced in width to closely fit within the apertures of the spring.

The purpose of these spring-pressed toggle arms is to hold switch arm 17 in what is termed a "set" position in which the toggle arms lie in an inclined plane between spring 36 and the switch arm, so that, as seen, they press radially upwardly on the switch arm. The resilient pressure of the spring is such that it holds the switch arm 17 in its set position until the crank shaft reaches a rotational speed which is considered to be dangerous to continued operation. At that time, the rotation of the crank shaft and plate 14 imparts sufficient centrifugal force to switch arm 17 to cause it to slide from its set position into its second, or outer position, in which contact members 24 and 26 are closed by contact bar 31.

During the sliding movement of the switch arm, the side portions of spring 36 spread, and toggle arms 32 and 33 remain in contact with the switch arm so that, at the extreme outer position of the switch arm, the toggle arms come to a position in which they press radially downwardly on it to keep the switch contacts closed. It will be appreciated that, as soon as the spring pressure is overcome by the centrifugal force created, and as switch arm 17 begins to move radially downwardly, the resistance extended through the toggle lessens rapidly, and, at the same time, the outward pressure on arm 17, due to centrifugal force, increases very rapidly as the radius of gyration of the center of gravity of the arm is increased by the outward movement. After the toggle arms reach a certain position, they will snap over center, and then exert a positive force to move the switch arm to its extreme outer position. Thus, as soon as the switch arm begins to move, there is an insurance that it will continue to move to its extreme outer position.

It also is desirable to provide a wide range of top speed limits at which the switch arm operates to shut off the motive power normally supplied to the crank shaft. For this purpose, a plurality of weights 41 are detachably secured, by bolts 42, to the switch arm. These weights may be calibrated and marked so that, when it is desired to limit the crank shaft to a certain top rotational speed, certain of the weights may be quickly chosen and secured to the arm. Also, the weights are mounted in such a fashion that they may be placed in a reverse position such as is illustrated by weight 41a (Fig. 2), the purpose of this being to achieve a finer adjustment by increasing or decreasing the distance between the axis of rotation of the crank shaft and the center of gravity of the switch arm. Another adjustable feature of the switch arm is that its threaded plunger 21 can be rotated to move the switch arm upwardly or downwardly as desired, head 22 of the plunger being slotted in the manner shown so as to facilitate its being turned. This upward or downward movement of the switch arm normally is made as a final adjustment after the proper weights have been mounted on the arm and turned into the desired position.

As has been stated, movement of switch arm 17 to its extreme outer position, closes contacts 24 and 26 of switch 23 and shuts off the supply of power for the crank shaft. The circuit for accomplishing this is shown in Fig. 1 and it includes an insulated conductor button 44 mounted centrally on casing 16, this button being contacted by a brush 46 which is electrically connected by means of conductor 47 to the primary of the magneto. Button 44 also is connected by a conductor 48 to bolt 28 of switch 23, and bolt 27 of this switch is grounded by a conductor 49. Consequently, when switch 23 is closed by the outward movement of switch arm 17, the primary of the magneto is short-circuited rendering spark plug 3 inoperative so that no power is supplied to the crank shaft. This condition then is maintained until switch arm 17 is returned from its outer position, as shown in dotted lines, to its set position described above; the importance of so maintaining the arm in its outer position being to keep the power shut off until an operator has an opportunity to inspect the machinery and make such adjustments or repairs as may be necessary.

It will be noted that in the arrangement described above, the switch is closed when the switch arm moves to its outer position, and, also, that the particular circuit used is arranged to short circuit the primary of the magneto when the switch is closed. However, it would not require any particular skill to substitute other electrical arrangements to accomplish the same general purpose as the arrangement shown, so that the invention should not be considered as limited to this particular arrangement. In fact, if the switching mechanism were used to control a battery circuit, it would be desirable to have the switch circuit closed during the set, or normal, position of the arm.

From the above, it will be seen that the invention provides unusually simple and inexpensive mechanism for shutting off the power of machinery when a driven member of the machinery reaches a dangerously high speed. Further, the arrangement of the resiliently pressed toggle arms against a switch arm which is slidable under the impulse of centrifugal force is one which assures positive outward movement of the switch arm once it begins to move. Thus, effective operation of the apparatus is practically a certainty and the machinery to which the apparatus is attached may be permitted to run without any attention for long periods of time.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. Apparatus for controlling the supply of motor power to a driven member, comprising a support form for attachment to such a member, an electric power-controlling contactor borne by said support, a rigid arm mounted on said support for movements to and from said contactor, a toggle bar engaging a side of said arm at its inner end and normally extending at an acute angle to said arm in opposition to its path of movement toward said contactor, and a leaf spring having a free end that engages the outer end of said bar and resiliently presses it longitudinally toward said arm yieldingly to urge the arm from engagement with said contactor, said arm being movable bodily into engagement of said contactor by force imparted to the arm when said driven member is driven in excess of a predetermined rate, said movement of said arm being effective to move said bar from its said acute angle position to a position in which it extends at an obtuse angle to said arm in the direction of the movement of the arm into engagement with said contactor, and said last-mentioned position of said bar being effective to maintain said arm in its contactor-engaging position until manually removed therefrom.

2. Apparatus for controlling the supply of motor power to a driven member, comprising a support form for attachment to such a member, an electric power-controlling contactor borne by said support, a rigid arm mounted on said support for movements to and from said contactor, a pair of toggle bars engaging opposite sides of said arm at their inner ends and normally extending at like acute angles to said arm in opposition to its path of movement toward said contactor, and a leaf spring having free ends that engage the outer ends of said bars and resiliently press them longitudinally toward said arm yieldingly to urge the arm from engagement with said contactor, said arm being movable bodily into engagement of said contactor by force imparted to the arm when said driven member is driven in excess of a predetermined rate, said movement of said arm being effective to move said bars from their said acute angle positions to positions in which they extend at like obtuse angles to said arm in the direction of the movement of the arm into engagement with said contactor, and said last-mentioned position of said bar being effective to maintain said arm in its contactor-engaging position until manually removed therefrom.

WILLIAM B. STAMFORD.

REFERENCES CITED

The following references are of record in the file of this patent:

UNITED STATES PATENTS

| Number | Name | Date |
| --- | --- | --- |
| 2,152,287 | Scott | Mar. 28, 1939 |
| 2,432,699 | Taylor | Dec. 16, 1947 |